United States Patent
Gibbs et al.

(10) Patent No.: US 12,113,464 B2
(45) Date of Patent: Oct. 8, 2024

(54) ADJUSTABLE FREQUENCY DRIVES USING NORMALIZED MODULATION CONTROL SIGNALS TO COMPENSATE FOR PHASE IMBALANCE AND METHODS OF OPERATING THE SAME

(71) Applicant: Eaton Intelligent Power Limited, Dublin (IE)

(72) Inventors: Irving A. Gibbs, Mills River, NC (US); Geraldo Nojima, Fort Mill, SC (US); Stan Rex Simms, Arden, NC (US); Thomas A. Farr, Candler, NC (US); Gabriel Braga, Belo Horizonte (BR)

(73) Assignee: Eaton Intelligent Power Limited, Dublin (IE)

( * ) Notice: Subject to any disclaimer, the term of this patent is extended or adjusted under 35 U.S.C. 154(b) by 3 days.

(21) Appl. No.: 17/807,162

(22) Filed: Jun. 16, 2022

(65) Prior Publication Data
US 2023/0412105 A1    Dec. 21, 2023

(51) Int. Cl.
*H02P 3/18* (2006.01)
*H02P 27/06* (2006.01)

(52) U.S. Cl.
CPC ................ *H02P 27/06* (2013.01)

(58) Field of Classification Search
CPC .................. H02P 27/06; H02P 27/085
See application file for complete search history.

(56) References Cited

U.S. PATENT DOCUMENTS

| | | | |
|---|---|---|---|
| 7,088,073 B2 | 8/2006 | Morishita | |
| 10,355,614 B1 * | 7/2019 | Tang | H02P 27/06 |
| 10,958,188 B1 | 3/2021 | Simms | |
| 2016/0380570 A1 * | 12/2016 | Farr | H02P 1/04 |
| | | | 318/504 |
| 2019/0296665 A1 * | 9/2019 | Matsubara | H02P 6/12 |
| 2019/0296677 A1 * | 9/2019 | Oka | H02P 21/20 |
| 2019/0348940 A1 * | 11/2019 | Li | H02P 25/188 |
| 2019/0386599 A1 * | 12/2019 | Takahashi | H02P 7/291 |

* cited by examiner

*Primary Examiner* — Muhammad S Islam
(74) *Attorney, Agent, or Firm* — Stanek Lemon Crouse & Meeks, PA

(57) ABSTRACT

An apparatus includes a plurality of DC buses and a plurality of inverter circuits, respective ones of which are coupled to respective ones of the plurality of DC buses. The apparatus further includes a control circuit configured to generate a representative DC voltage signal based on DC voltage signals for respective ones of the DC buses, to generate a first modulation control signal from the representative DC voltage signal, to generate second modulation control signals for the respective inverter circuits from the representative DC voltage signal and the first modulation control signal that are normalized based on the DC voltage signals for the buses and the representative DC voltage signal, and to modulate the inverter circuits responsive to respective ones of the second modulation control signals. The representative DC voltage signal may represent a maximum of the DC voltages for the respective DC buses.

9 Claims, 4 Drawing Sheets

ADJUSTABLE FREQUENCY DRIVES USING NORMALIZED MODULATION CONTROL SIGNALS TO COMPENSATE FOR PHASE IMBALANCE AND METHODS OF OPERATING THE SAME

BACKGROUND

The inventive subject matter relates to electrical apparatus and methods and, more particularly, to motor drives and similar power converter devices.

Adjustable frequency drives (AFDs) typically include an input rectifier and a three-phase output inverter coupled by a DC bus. The inverter may be controlled by a vector controller that generates a modulation amplitude index signal and an angle signal responsive to a voltage on the DC bus and a motor current. The modulation amplitude index signal and phase angle signal are used to generate pulse-width modulation (PWM) signals that are used to drive transistors of the inverter.

Some motor drives incorporate a multilevel cascaded inverter (MLCI) topology that employs separate DC links for the respective phases. The multiple DC links can exhibit imbalances that can result in an unbalanced output from the MLCI. Techniques for balancing MLCIs are described in "A Carrier-Based Neutral Voltage Modulation Strategy for Multilevel Cascaded Inverters Under Unbalanced DC Sources" by Cho et al., IEEE Transactions on Industrial Electronics, vol. 61, no. 2 (2014).

An AFD may encounter conditions, such as deceleration or overhauling, in which power may be fed back to the DC bus, which may result in an undesirable increase in DC bus voltage. Techniques for preventing DC bus overvoltage include controlling the inverter output frequency and using resistive limiters to limit the bus voltage. Conventional techniques for addressing DC bus overvoltage conditions are described, for example, in U.S. Pat. No. 7,088,073 to Morashita and U.S. Pat. No. 10,958,188 to Simms.

SUMMARY

Some embodiments provide an apparatus (e.g., a motor drive) including a plurality of DC buses and a plurality of inverter circuits, respective ones of which are coupled to respective ones of the plurality of DC buses. The apparatus further includes a control circuit configured to generate a representative DC voltage signal based on DC voltage signals for respective ones of the DC buses, to generate a first modulation control signal from the representative DC voltage signal, to generate second modulation control signals for the respective inverter circuits from the representative DC voltage signal and the first modulation control signal that are normalized based on the DC voltage signals for the buses and the representative DC voltage signal, and to modulate the inverter circuits responsive to respective ones of the second modulation control signals. The representative DC voltage signal may represent a maximum of the DC voltages for the respective DC buses.

In some embodiments, the control circuit may be configured to control an output frequency of the inverter circuits to limit DC voltages on the buses responsive to the representative DC voltage signal meeting a predetermined criterion.

In some embodiments, the first modulation control signal may include a first modulation amplitude index signal and an angle signal. The control circuit may be configured to apply an inverse Clarke transformation to the first modulation amplitude index signal and angle signal to generate respective second modulation amplitude index signals, to generate respective gain factors for the respective inverter circuits based on the voltage signals for the DC buses and the representative DC voltage signal, and to scale respective ones of the second modulation amplitude index signals by the respective gain factors to generate respective ones of the second modulation control signals.

Further embodiments provide an apparatus including a plurality of DC buses, a plurality of inverter circuits, respective ones of which are coupled to respective ones of the plurality of DC buses, and a control circuit configured to generate a maximum DC voltage signal corresponding to a maximum DC voltage of the DC buses, to generate modulation control signals for respective ones of the inverter circuits responsive to the maximum DC voltage signal, to modulate the inverter circuits responsive to respective ones of the modulation control signals and to control an output frequency of the inverter circuits to limit DC voltages on the buses responsive to the maximum DC voltage signal meeting a predetermined criterion. The control circuit may be configured to generate the maximum voltage signal responsive to respective DC voltage signals for respective ones of the DC busses. The control circuit may be configured to scale the modulation control signals based on a relationship between the DC voltage signals for the buses and the maximum DC voltage signal.

Further embodiments provide methods of operating a motor drive comprising a plurality of DC buses and a plurality of inverter circuits, respective ones of which are coupled to respective ones of the plurality of DC buses. The methods include generating a representative DC voltage signal based on DC voltage signals for respective ones of the DC buses, generating a first modulation control signal from the representative DC voltage signal, generating second modulation control signals for respective ones of the inverter circuits from the representative DC voltage signal and the first modulation control signal that are normalized based on the DC voltage signals for the buses and the representative DC voltage signal, modulating the inverter circuits responsive to respective ones of the second modulation control signals. The representative DC voltage signal may represent a maximum of the DC voltages for the respective DC buses.

DETAILED DESCRIPTION

Figure 1:
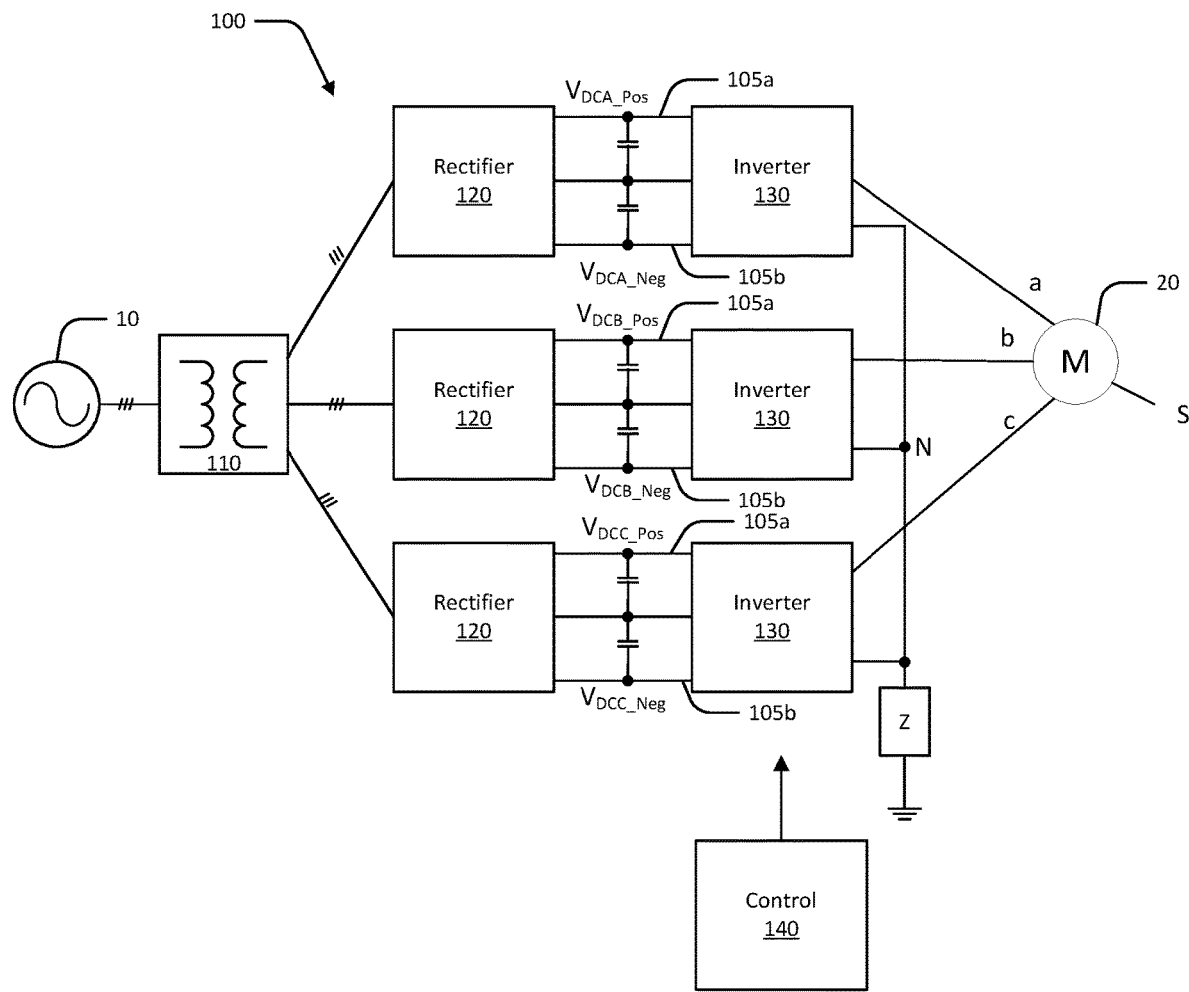
FIG. 1 is a schematic diagram illustrating a variable frequency motor drive apparatus according to some embodiments of the inventive subject matter.

The inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments herein with reference to block diagrams and/or flowchart illustrations. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a tangible or non-transitory computer-readable storage medium that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having tangible, non-transitory computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Some adjustable frequency drives (AFDs) may utilize single phase output inverters that are fed by separate rectifiers via separate DC buses. Use of a conventional vector controller with a single DC voltage input in such AFDs can be problematic. A utility source coupled to the input of the AFD may have a slight fundamental voltage unbalance or pre-existing $5^{th}$ and $7^{th}$ harmonic content that results in unbalanced DC voltage in the converter DC links. As power is drawn from the utility source to the DC link to the AC motor, the geometry and winding layout of an input transfer of the AFD may be such that impedances are unequal, causing the DC buses to have unbalances. Lack of compensation for these imbalance in the modulation of the inverters can result in a current imbalance in the motor and cause an undesirable temperature rise in the motor. Significant imbalance may necessitate derating the AFD.

Some embodiments address such imbalances by using a representative DC bus voltage (e.g., a maximum DC bus voltage) as an input to a motor controller that creates a modulation amplitude index and angle (frequency output) that is then transformed into phase modulation amplitude indices for the respective inverters. These per phase modulation amplitude indices are then normalized based on the relationship of the representative DC bus voltage to the DC bus voltages of the DC buses to generate reference signals for the individual inverters for the phases. A zero sequence component may be added to the reference signals before normalization.

According to further aspects, when motor driven by an AFD is being slowed, decelerating or overhauling (negative slip), there can be a positive speed and negative torque condition that produces negative power. This can result in an increase in the voltage on the DC bus coupled to the AFD output inverters. Some conventional systems address such a condition using a regenerative input converter or braking, such as a brake chopper. Regenerative compensation may be not feasible if the AFD has a 2-quadrant diode front end. Therefore, braking may be limited to DC bus discharge bleedoff resistors, windage friction of the motor, core losses of the motor, copper losses of the conductors to and in the motor, and switching conduction losses of the inverter itself, which collectively may be relatively small. Accordingly, some AFD controllers sense DC bus voltage and, when it falls outside of a certain bounds, go into a mode wherein the frequency of the output inverter is controlled to increase or reduce the amount of power coming back into the DC bus. In some embodiments matter, AFD apparatus with separate DC buses for each phase as described above may utilize a maximum DC voltage of the DC buses as the input to such a limiter control to ensure that none of the DC buses experiences an undesirable voltage level.

FIG. 1 illustrates a variable speed motor drive apparatus 100 according to some embodiments. The apparatus 100 includes an input transformer 110 having primary windings configured to be coupled to a three-phase AC power source 10. First, second and third rectifier circuits (e.g., 2-quadrant 24-pulse diode rectifier circuits) 120 are coupled to secondary windings of the transformer 110. Outputs of the rectifier circuits 120 are coupled to respective single-phase inverter circuits (e.g., 3-level inverter circuits) 130 by respective separate pairs of positive and negative DC buses 105a, 105b. Respective ones of the inverter circuits 130 are configured to be coupled to respective phases a, b, c of a motor 20 and the inverters 130 are commonly connected at a neutral point N (coupled to a ground by an impedance Z). A control circuit 140 controls the inverters 130. Windings of the motor 20 are connected in a "Y" configuration at an internal neutral point S. As explained in detail below, the control circuit 140 may be configured to provide a normalized modulation of the inverter circuits 130 that compensates for imbalances among the voltages $V_{DCA\_Pos}$, $V_{DCA\_Neg}$, $V_{DCB\_Pos}$, $V_{DCB\_Neg}$, $V_{DCC\_Pos}$, $V_{DCC\_Neg}$ of the DC buses 105a, 105b.

It will be appreciated that the rectifier circuits 120 may take any of a variety of difference forms including, but not limited to, diode rectifier circuits. The inverter circuits 130 may have any of a number of different topologies including, but not limited to two-level, three-level and higher-order inverter topologies. The control circuit 120 may generally be implemented using analog and/or digital circuitry, such as control circuits employing data processing circuits employing microprocessors, microcontrollers or the like, in conjunction with peripheral circuitry, such as analog-to-digital (A/D) converters, digital-to-analog (D/A) converters, memory devices, and the like. Such data processing circuits may be configured to execute software, firmware and the like to implement control operations as described herein.

Figure 2:
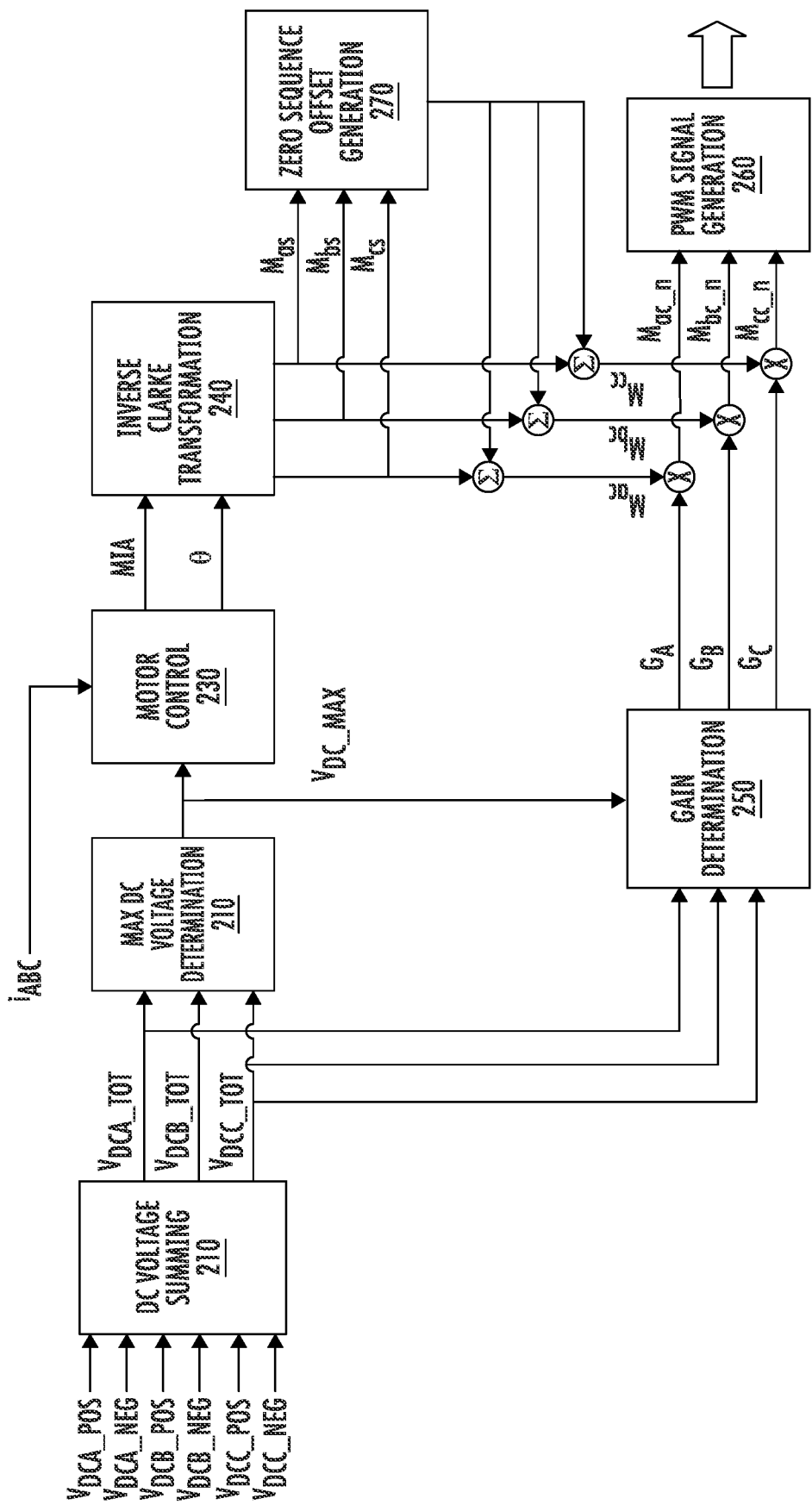
FIG. 2 is a schematic diagram illustrating a phase normalizing control circuit for the apparatus of FIG. 1 according to some embodiments.

FIG. 2 illustrates a control architecture that may be implemented by the control circuit 120, e.g., using computer instructions executing on a data processing device, such as a microcontroller which is interfaced to power electronics devices of the rectifier circuits 120 and inverter circuits 130 and interconnecting circuit paths thereof. DC bus voltage signals $V_{DCA\_Pos}$, $V_{DCA\_Neg}$, $V_{DCB\_Pos}$, $V_{DCB\_Neg}$, $V_{DCC\_Pos}$, $V_{DCC\_Neg}$ corresponding to voltages at the respective buses 105a, 105b are summed in a DC voltage summing unit 210 for each phase to generate DC bus total voltage signals $V_{DCA\_Tot}$, $V_{DCB\_Tot}$, $V_{DCC\_Tot}$ representing the voltages between the positive and negative buses 105a, 105b. A maximum DC voltage determination unit 220 generates a maximum DC voltage signal $V_{DC\_Max}$ corresponding to the maximum value of the DC bus total voltage signals $V_{DCA\_Tot}$, $V_{DCB\_Tot}$, $V_{DCC\_Tot}$. This maximum DC voltage signal $V_{DC\_Max}$ is applied to a motor control unit 230, which also receives a motor current signal $i_{ABC}$. The motor control unit 230 responsively determines a voltage vector having an amplitude component and an angle component) to be produced at the outputs of the invertors 130. The motor control circuit 230 uses the maximum DC voltage signal $V_{DC\_Max}$ to convert the amplitude component into a modulation index amplitude signal MIA. The modulation index amplitude signal MIA and an angle signal θ corresponding to the angle component of the voltage vector are applied to an inverse Clarke transformation unit 240, which responsively generates respective modulation control signals for each phase, here shown as modulation signals $M_{as}$, $M_{bs}$, $M_{cs}$, corresponding to respective ones of the inverter circuits 130. The "s" index for the modulation signals $M_{as}$, $M_{bs}$, $M_{cs}$ indicates that these signals refer to a desire voltage from the respective phase to the motor neutral S.

The modulation signals $M_{as}$, $M_{bs}$, $M_{cs}$ are all scaled based on the maximum DC voltage signal $V_{DC\_Max}$, which is a representative signal that does not reflect the individual conditions of all of the inverters 130. To correct this, the maximum DC voltage signal $V_{DC\_Max}$ is also provided to a gain determination unit 250, which determines respective gain factors $G_A$, $G_B$, $G_C$ that will be applied to modulation signals for respective ones of the inverter phases based on the relationship between each of the DC bus total voltage signals $V_{DCA\_Tot}$, $V_{DCB\_Tot}$, $V_{DCC\_Tot}$ to the maximum DC voltage signal $V_{DC\_Max}$. A zero sequence offset generation unit 270 generates a common offset component to be applied to the modulation signals $M_{as}$, $M_{bs}$, $M_{cs}$, to increase a maximum inverter output voltage allowed for a given DC bus voltage condition, reduce or minimize time for individual PWM pulse and thus reduce or eliminate narrow pulse issues in switching devices (e.g., IGBTs) of the inverters 130, and improve current sharing among the switching devices. The resultant compensate modulation signals $M_{ac}$, $M_{bc}$, $M_{cc}$ are scaled by the gain factors $G_A$, $G_B$, $G_C$ to provide normalized compensated modulation amplitude index signals $M_{ac\_n}$, $M_{bc\_n}$, $M_{cc\_n}$. The normalized compensated modulation amplitude index signals $M_{ac\_n}$, $M_{bc\_n}$, $M_{cc\_n}$ are provided to a pulse width modulation (PWM) signal generation unit 260, which produces PWM signals for modulating the inverter circuits 130.

Figure 3:
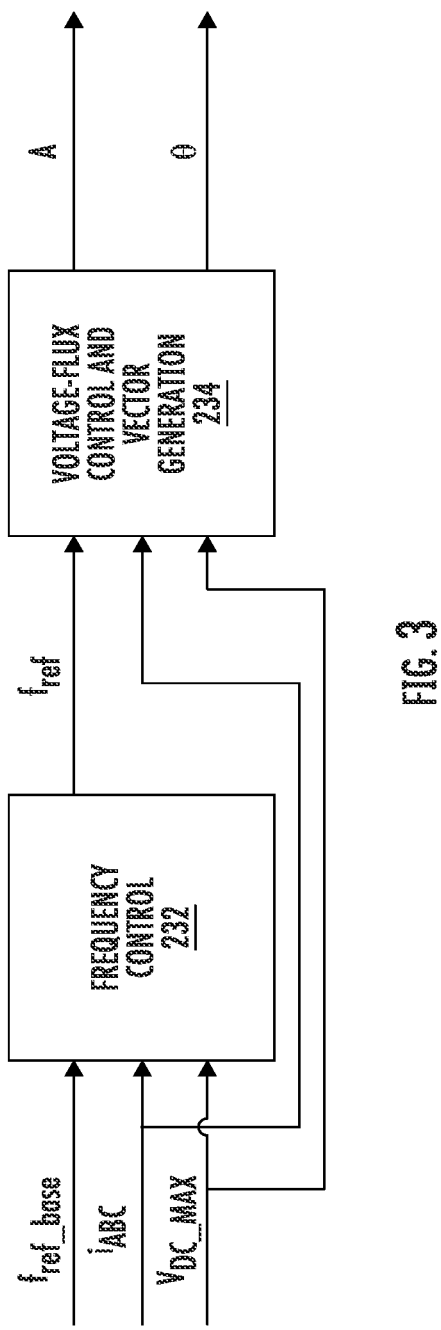
FIG. 3 is a schematic diagram illustrating a motor control circuit according to further embodiments.

According to further aspects, the maximum DC voltage signal $V_{DC\_Max}$ may be used as an input for controlling the inverter frequency for purposes of DC bus limiting. Referring to FIG. 3, the motor control unit 230 of FIG. 2 may include a frequency control unit 232 that receives a base frequency reference signal $f_{ref\_base}$ that corresponds to a desired speed for the motor 20, along with the maximum DC voltage signal $V_{DC\_Max}$ and the motor current signal $i_{ABC}$. The frequency control unit 232 generates a compensated frequency reference signal $f_{ref}$, which is derived from the base frequency reference signal $f_{ref\_base}$ based on the maximum DC voltage signal $V_{DC\_Max}$ and the motor current signal $i_{ABC}$. The compensated frequency reference signal $f_{ref}$ is provided to a voltage-flux control and vector generation unit 234, which generates a voltage vector with amplitude A and angle θ for controlling the motor 20.

Figure 4:
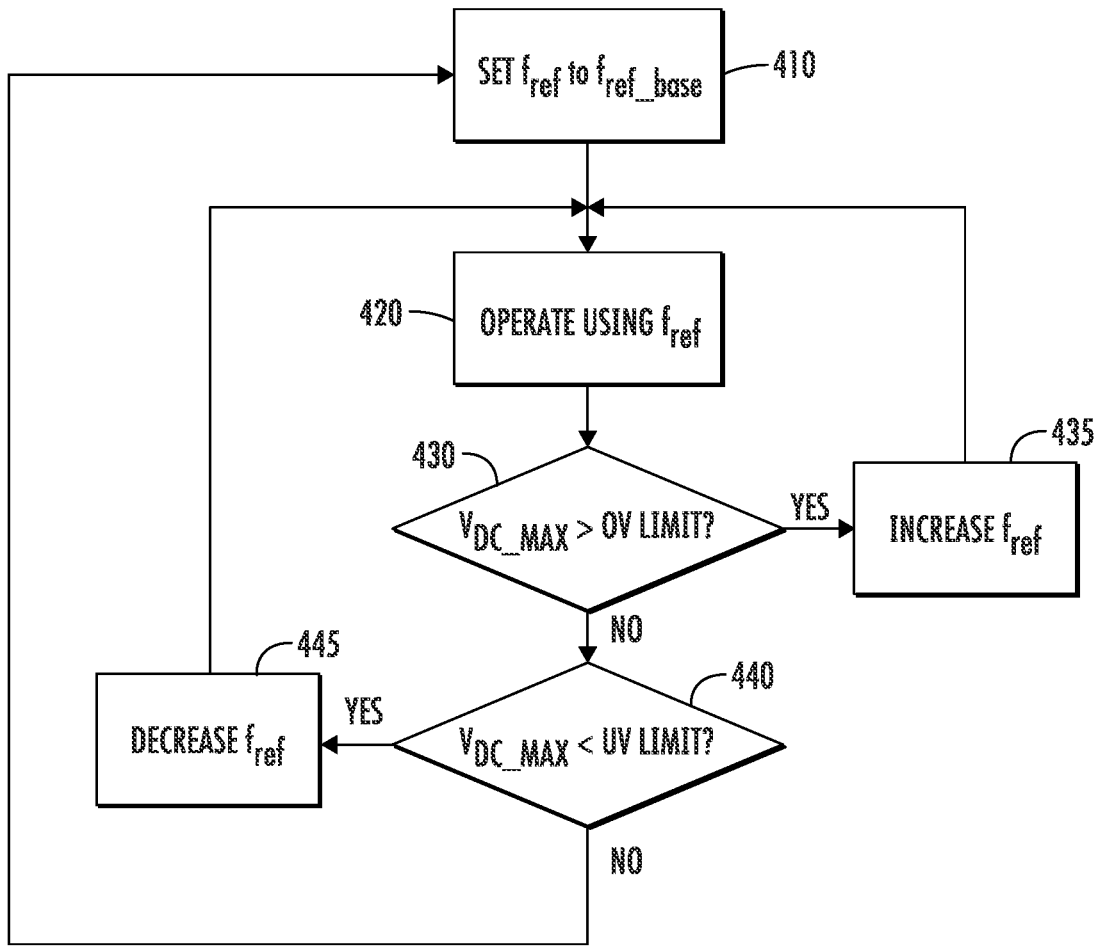
FIG. 4 is a flowchart illustrating operations of the motor control circuit of FIG. 3 according to some embodiments.

Referring to FIG. 4, the compensated frequency reference signal $f_{ref}$ is set to the base frequency reference signal $f_{ref\_base}$ and the motor operated at this frequency under normal DC voltage conditions (blocks 410, 420). If the maximum DC voltage signal $V_{DC\_Max}$ indicates that the maximum DC bus voltage exceeds an overvoltage limit, however, the frequency commanded by the compensated frequency reference signal $f_{ref}$ is increased and this increased frequency reference used to operate the motor 20, thus reducing the DC bus voltages (blocks 430, 435, 420). Similarly, if the maximum DC voltage signal $V_{DC\_Max}$ indicates that the maximum DC bus voltage has fallen below an undervoltage limit, the frequency commanded by the compensated frequency reference signal $f_{ref}$ is decreased and this decreased frequency reference is used to operate the motor 20 and thus increase the DC bus voltages (blocks 440, 445, 420). If the maximum DC bus voltage indicated by the maximum DC voltage signal $V_{DC\_Max}$ returns to within the overvoltage and undervoltage limits, the compensated the compensated frequency reference signal $f_{ref}$ returns to the frequency commanded by the base frequency reference signal $f_{ref\_base}$.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus comprising:
a plurality of DC buses;
a plurality of inverter circuits, respective ones of which are coupled to respective ones of the plurality of DC buses; and
a control circuit configured to generate a representative DC voltage signal based on DC voltage signals for respective ones of the DC buses, to generate a first modulation control signal from the representative DC voltage signal, to generate second modulation control signals for the respective inverter circuits from the representative DC voltage signal and the first modulation control signal that are normalized based on the DC voltage signals for the buses and the representative DC voltage signal, and to modulate the inverter circuits responsive to respective ones of the second modulation control signals, wherein the first modulation control signal comprises a first modulation amplitude index signal and an angle signal and wherein the control circuit is configured to apply an inverse Clarke transformation to the first modulation amplitude index signal and angle signal to generate respective second modulation amplitude index signals, to generate respective gain factors for the respective inverter circuits based on the voltage signals for the DC buses and the representative DC voltage signal, and to scale respective ones of the second modulation amplitude index signals by the respective gain factors to generate respective ones of the second modulation control signals.

2. The apparatus of claim 1, wherein the representative DC voltage signal represents a maximum of the DC voltages for the respective DC buses.

3. The apparatus of claim 1, wherein the plurality of DC buses comprises a plurality of pairs of positive and negative DC buses, and wherein the DC voltage signals for the DC buses represent voltages between the positive and negative busses of the respective pairs of DC buses.

4. The apparatus of claim 1 configured as a motor drive, wherein respective ones of the inverter circuits are configured to be coupled to respective phases of a motor.

5. The apparatus of claim 2, wherein the control circuit is configured to control an output frequency of the inverter circuits to limit DC voltages on the buses responsive to the representative DC voltage signal meeting a predetermined criterion.

6. A method of operating a motor drive comprising a plurality of DC buses and a plurality of inverter circuits, respective ones of which are coupled to respective ones of the plurality of DC buses, the method comprising:
generating a representative DC voltage signal based on DC voltage signals for respective ones of the DC buses;
generating a first modulation control signal from the representative DC voltage signal;
generating second modulation control signals for respective ones of the inverter circuits from the representative DC voltage signal and the first modulation control signal that are normalized based on the DC voltage signals for the buses and the representative DC voltage signal; and
modulating the inverter circuits responsive to respective ones of the second modulation control signals, wherein the first modulation control signal comprises a first modulation amplitude index signal and an angle signal, and wherein generating second modulation control signals comprises:
applying an inverse Clarke transformation to the first modulation amplitude index signal and angle signal to generate respective second modulation amplitude index signals for the respective inverter circuits;
generating respective gain factors for the respective inverter circuits based on the voltage signals for the DC buses and the representative DC voltage signal; and
scaling respective ones of the second modulation amplitude index signals by the respective gain factors to generate respective ones of the second modulation control signals.

7. The method of claim 6, wherein the representative DC voltage signal represents a maximum of the DC voltages for the respective DC buses.

8. The method of claim 6, wherein the plurality of DC buses comprises a plurality of pairs of positive and negative DC buses, and wherein the DC voltage signals for the DC buses represent voltages between the positive and negative busses of the respective pairs of DC buses.

9. The method of claim 7, further comprising controlling an output frequency of the inverter circuits to limit DC voltages on the buses responsive to the representative DC voltage signal meeting a predetermined criterion.

* * * * *